Sept. 15, 1970  J. W. GOOTHERTS ET AL  3,529,166
ELECTROMAGNETIC POSITION-INDICATING SYSTEM
Filed July 1, 1963  6 Sheets-Sheet 1

INVENTORS
JEROME W. GOOTHERTS
SHELDON A. KNIGHT
BY
Mellin and Hanscom
ATTORNEYS

United States Patent Office 3,529,166
Patented Sept. 15, 1970

3,529,166
ELECTROMAGNETIC POSITION-INDICATING SYSTEM
Jerome W. Gootherts, Sunnyvale, and Sheldon A. Knight, Mountain View, Calif., assignors, by mesne assignments, to TRW Inc., a corporation of Ohio
Filed July 1, 1963, Ser. No. 292,042
Int. Cl. G01j 1/20
U.S. Cl. 250—203   14 Claims This application is related to the application of J. W. Gootherts, S.N. 118,868, filed June 22, 1961, now Pat. 3,200,333, issued Aug. 10, 1965, and to the application of S. A. Knight, S.N. 120,043, filed June 27, 1961, now Pat. 3,155,830, issued Nov. 3, 1964.

This invention relates to and has for its object the provision of electromagnetic position-indicating systems and a method for providing a signal to indicate the position of a scanning member.

Although its use is not so limited, the present invention was developed for use in navigational systems employed in space vehicles or the like wherein the infrared horizon of the earth is tracked and used as a reference for navigation. One general system that is used for such purposes employs a scanning member which continuously tracks the infrared discontinuity existing at the earth's infrared horizon and the background space. The angle between the scanning member and a fixed axis of the vehicle is sensed to give an indication of the angle of the vehicle's axis to the earth. This angular indication is then fed into suitable computer equipment in order to provide for suitable correction of the position of the vehicle relative to the earth.

The primary object of the present invention is to provide systems for detecting the angular position of such a scanning member relative to a reference axis of the vehicle.

Yet another object is to provide systems for providing electrical signals for indicating the angular position of a scanning member relative to a reference axis and in which the position signals can be used in open or closed loop control circuits.

A further object of the invention is to provide an electro-mechanical scanner and position indicator which eliminates bearings in order to eliminate friction and the need for lubrication.

Another object of the invention is to provide a position-indicating system having minimum parts to reduce the weight of the system.

Still another object of the invention is to provide an electro-mechanical scanning member with electrical means for detecting accurately the angular position of the scanner.

A further object of the invention is to provide a method for producing a signal indicating the position of a scanning member.

The invention possesses other advantageous features and objects, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings.

BASE AND ARMATURE SUBASSEMBLY

Figure 5:
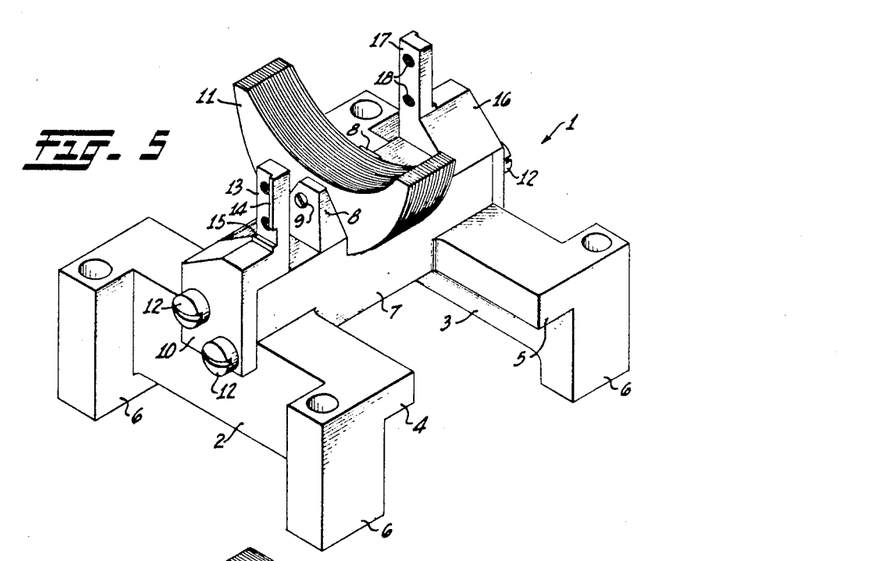
FIG. 5 is a perspective view of the base and armature subassembly of the detector illustrated in the above figures with the base magnet omitted.

As more particularly shown in FIG. 5, the base and armature subassembly includes an H-shaped aluminum base generally referred to by the reference numeral 1 and which includes legs 2 and 3, provided with overhanging flanges 4 and 5 and feet 6 and with a crossbar 7 provided with a pair of upstanding, symmetrically disposed, upwardly extending and upwardly tapered lugs 8.

Seated on the crossbar 7 within the confines of the lugs 8 and secured thereto by set screws 9 is a laminated, crescent-shaped armature core 11. Preferably, the core 11 is acid-etched for the purpose of removing burrs.

Fixed to the left end of the crossbar (as viewed in FIG. 5) by screws 12 is an aluminum angle bracket 10 provided on its right-hand side with an upstanding post 13. Formed on the right-hand side of the post 13 is an outwardly extending shoulder 14 and formed at the base of the post 13 is a shoulder 15. Similarly mounted on the right-hand end of the crossbar 7 is an aluminum angle bracket 16 formed with an upstanding post 17 and otherwise identical to the angle bracket 10. Here it should be noted that the two posts 13 and 17 are diagonally opposed to each other and that each post is provided with threaded screw holes 18.

POLE PIECE AND MAGNET RETAINER SUBASSEMBLY

Figure 6:
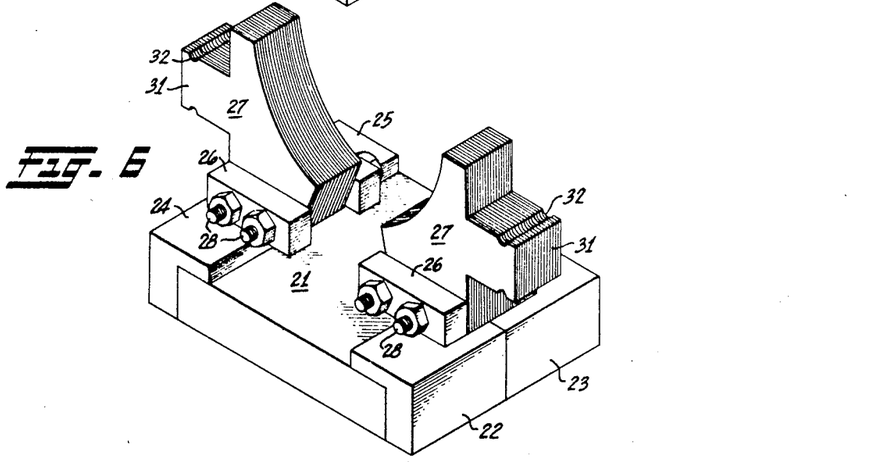
FIG. 6 is a perspective view of the permanent magnet and field coil pole piece subassembly.

Nested within the confines of the legs 2 and 3 of the base 1 and secured thereto is a pole piece and magnet retainer subassembly best shown in FIG. 6. Here it should be observed that FIGS. 5 and 6 may be considered as an exploded view of the base and armature subassembly, and pole piece and magnet retainer subassembly.

Figure 4:
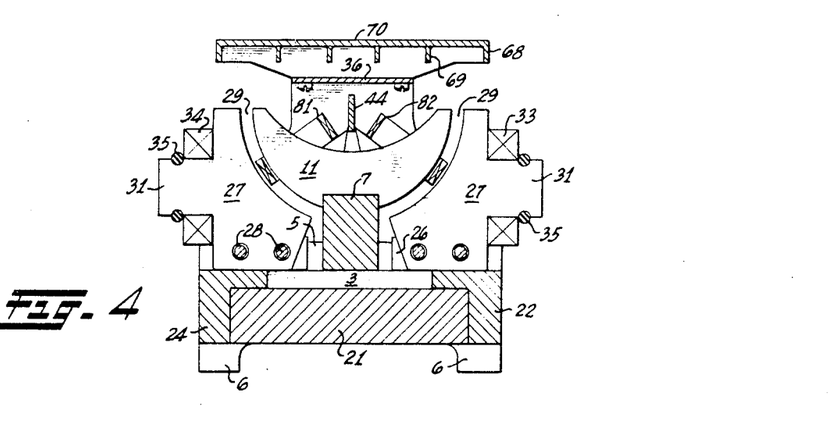
FIG. 4 is a vertical midsection taken on the section line 4—4 of FIG. 2.

The latter subassembly includes a permanent magnet 21 secured at its north and south ends to two opposed pairs of angle clamps 22 and 23, and 24 and 25. Each of these clamps is formed on its upper side with a clamping jaw 26 partially overhanging the magnet 21. Nested between each pair of opposed jaws 26 is a laminated pole piece 27, bolts 28 extending through the jaws 26 and through the pole piece 27 being used to form an integral unitary structure of these components. The opposed faces of the pole piece 27 are of arcuate configuration and together form a centrally interrupted concave semicylindrical surface for the reception of the crossbar 7 and the armature 11. From FIG. 4 it will be noted that a substantial annular gap 29 exists between the armature 11 and the pole pieces 27.

Formed on the outer faces of each of the pole pieces 27 is a generally rectangular field coil mount 31, each provided with a ring retaining groove or recess 32.

Mounted on the mounts 31 are A.C. field coils 33 and 34 (FIGS. 1, 3 and 4) held in place by an O ring or split ring 35.

ROTARY SUPPORT ASSEMBLY

Figure 7:
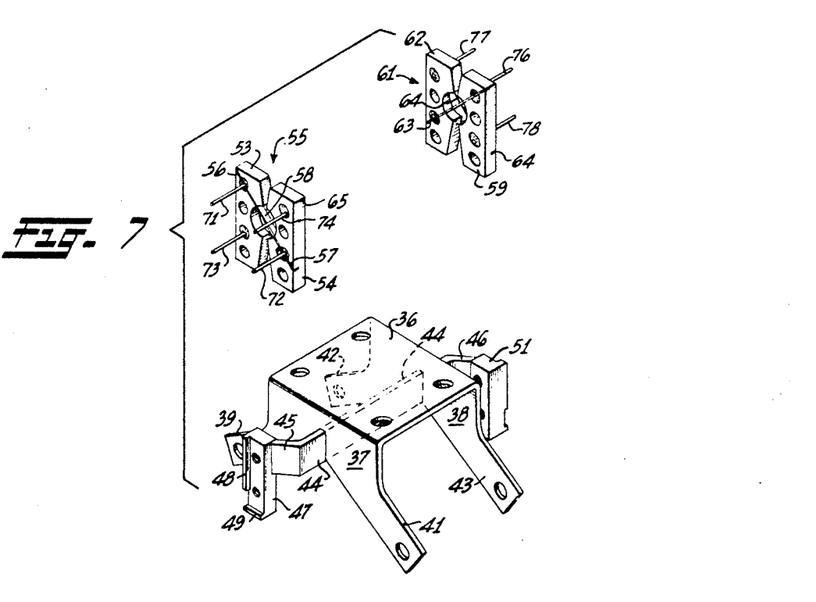
FIG. 7 is an exploded perspective view of the rotor support subassembly.

As best shown in the exploded view of FIG. 7, the rotor support assembly includes a rectangular table or platform 36 formed with opposed side skirts 37 and 38, preferably made of aluminum. Formed integral with the side skirt 37 are opposed, diverging legs 39 and 41, and similarly diverging from the side skirt 38 are legs 42 and 43. Extending through the skirts 37 and 38 and formed integral therewith is a suspension bar 44 provided with oppositely offset ends 45 and 46.

FLEXURE PIVOT SUBASSEMBLY

Secured or formed integral with the offset end 45 is a bracket 47 formed with a vertical shoulder 48 and with a lower horizontal shoulder 49. Similarly provided on the end of the end of the opposed offset end 46 is a bracket 51 identical to the bracket 47 but diagonally opposed thereto.

Secured to the outer face of the bracket 47 by screws 52 and snugly within the confines of the shoulders 48 is an insulating plate 53 conveniently made of laminated glass, fiber and plastic. Disposed adjacent the plate 53 is an identical, opposing but reversely facing plate 54. For purposes of ready reference, the two plates 53 and 54 and their interconnecting springs (to be presently described) will be referred to as a flexure pivot subassembly and generally referred to by the reference numeral 55.

The outer faces of the plates 53 and 54 are provided with aligned diagonal slots 56 and 57 and secured in these slots is a thin beryllium-copper leaf spring 58. For this purpose an epoxy resin can be used.

Screwed to the bracket 51 is the plate 59 of a flexure pivot subassembly generally referred to by the reference numeral 61, similar to the flexure pivot assembly 55 and including an opposed plate 62. The forward faces of the plates 59 and 62 are interconnected by a diagonally disposed thin leaf spring 63 contained in a plane at right angles to the plane in which the spring 58 of the subassembly 55 is contained. The rear faces of the plates 59 and 62 are interconnected by a thin leaf spring 64, this spring and the spring 58 being coplanar but running at right angles to its companion spring 63. Connecting the back sides of the plates 53 and 54 is a diagonally disposed leaf spring 65 crossing its companion spring 58 (FIG. 1) and coplanar with the leaf spring 63 of the subassembly 61.

As a result of this construction it will be seen that the diagonally opposed plates 53 and 59 are secured rigidly to the ends of the suspension bar 44 and that the other diagonally opposed pair of plates 54 and 62 are rigidly secured to the diagonally opposed posts 13 and 17 and hence to the base subassembly 1. The only connection between the table or platform 36 and the base subassembly 1 is then by way of the two pairs of crossed leaf springs 58 and 65, and 61 and 63. Each crossed pair of leaf springs supports the platform or table 36 cantileverwise and consequently any movement of the table is constrained to rotary movement about an axis determined by the two points of intersection of the two pairs of crossed leaf springs. This action is well known and generally referred to as a restrained flexure pivot.

Figure 1:
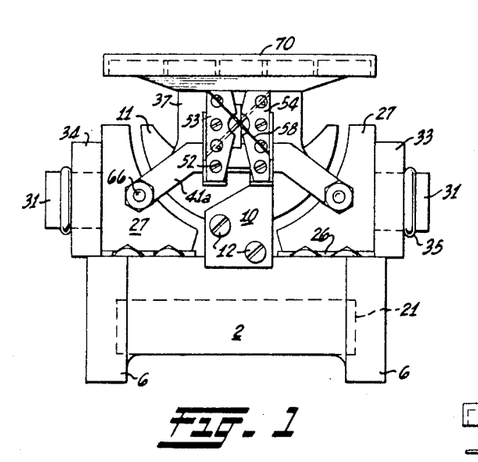
FIG. 1 is a side elevation of a position detector for use in a position detecting system embodying the objects of the invention.
Figure 2:
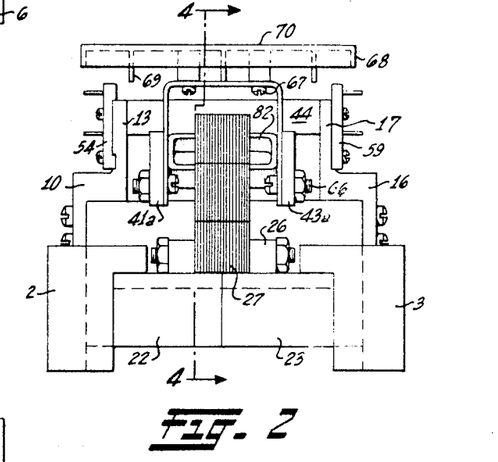
FIG. 2 is a right end elevation of the detector illustrated in FIG. 1, with the field coils removed.
Figure 3:
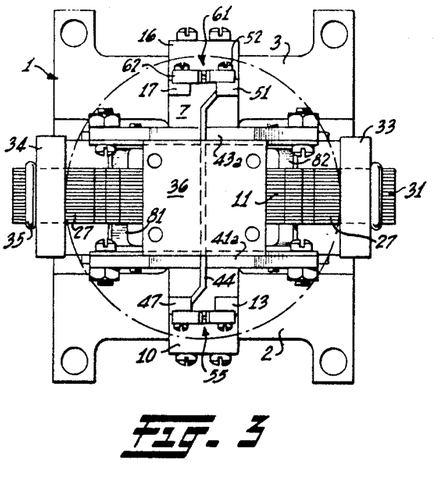
FIG. 3 is a plan of the detector shown in FIGS. 1 and 2 with mirror removed.

As shown in FIGS. 1, 2 and 3 (but not shown in FIG. 7), nonmagnetic counterweights 41a and 43a are secured to the outer faces of the table legs 41 and 43 by bolts 66. These counterweights parallel the legs 41 and 43 and extend across the intervening skirts 37.

Fastened to the table or platform 36 by screws 67 is a circular aluminum mirror support 68 provided on its under side with reinforcing ribs 69. Preferably a mirror surface 70 is formed directly on the upper face of the support, and here it should be noted that the mirror is simply one form of a scanning member operating in response to the rotation of the rotor, table or platform 36.

Welded to each end of leaf spring 58 are outwardly extending terminal pins 71 and 72 and similarly connected with the ends of crossing leaf spring 65 are terminal pins 73 and 74. In like manner the leaf spring 63 of the subassembly 61 is provided with terminal pins 75 and 76 and the leaf spring 64 with terminal pins 77 and 78 (see FIG. 8). Here it should be noted that although the leaf springs of each pair of springs are crossed, they have no electrical contact with each other. Also, it should here be noted that the adjacent edges of the plates 53 and 54 and the adjacent edges of the plates 62 and 59 are divergent and spaced from each other so as to accommodate the suspension bar 44 and permit it to rotate through a limited angle so that plate 53 does not contact plate 54 and plate 59 does not contact plate 62.

The use of the flexure pivot assemblies has a significant advantage in the present invention in that they provide the reliability that is essential for space vehicle operation. These assemblies eliminate friction between moving parts and thus eliminate the necessity for lubrication and maintenance of otherwise needed bearings.

DRIVE COILS

Circumscribing the left-hand end of the armature core 11 (FIGS. 2, 4 and 8) with positive clearance is a drive coil 81, and likewise circumscribing the other end of the armature core 11 is a drive coil 82. Conveniently, these coils can be made of rectangular configuration to snugly fit between each opposed pair of table legs 41 and 43 and can be bonded thereto by any suitable adhesive. The coils 81 and 82 can therefore move with rotor assembly relative to the stationary armature 11.

CIRCUITRY OF POSITION INDICATOR

Figure 8:
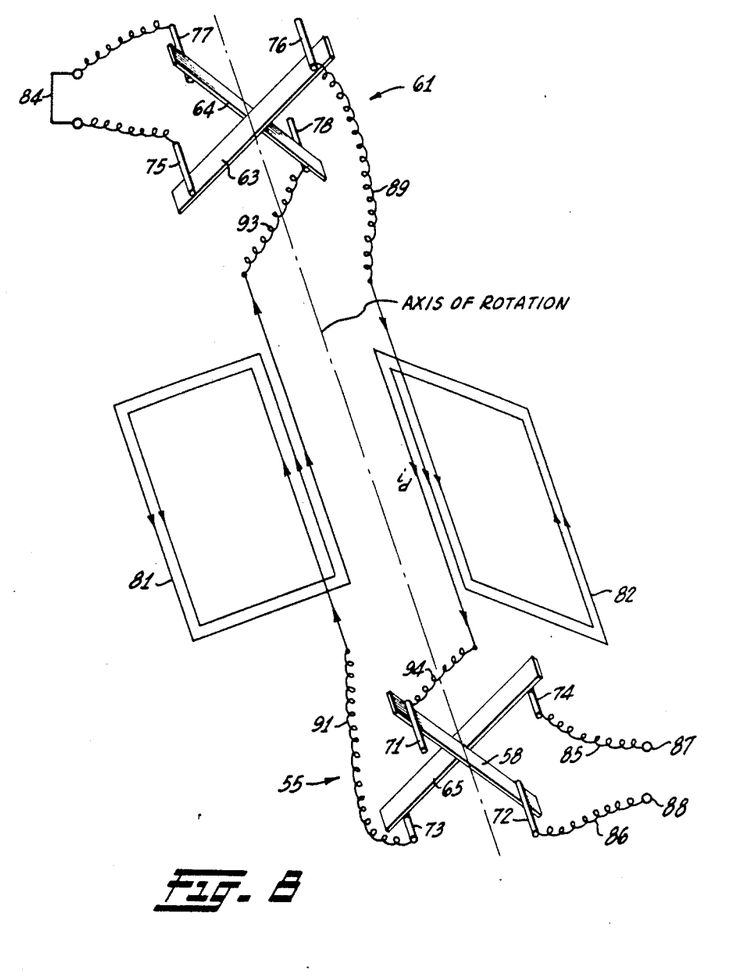
FIG. 8 is a schematic diagram of the detector drive coils, and flexure pivot circuitry.

As shown in FIG. 8, an external jumper 84 is connected across the terminal pins 75 and 77 and the terminal pins 72 and 74 are connected through leads 85 and 86 to terminals 87 and 88 by which the drive coil circuit can be connected to a drive current input and a high-frequency oscillator, as will be discussed hereinafter. One end of the coil 82 is connected through a lead 89 with the terminal pin 76 and its other end is connected through a lead 94 with the terminal 71. Similarly, the coil 81 is connected at one end through a lead 93 with the terminal pin 78 and at its other end through a lead 91 with the terminal pin 73. As a result of this, it will be seen that the coils 81 and 82 are connected in series through the assembly 61 and are connected through the assembly 55 with the terminals 87 and 88.

The field coils 33 and 34, which are inductively coupled to the magnet 27, are connected in series and have output terminals 91 and 92.

By way of summary, it will be seen that the position detector above described consists of a rotor which is attached to a base by two restrained flexure pivots which allow the rotor a limited rotary motion about a fixed axis of rotation. The rotor consists of a frame on which are fastened the drive coils 81 and 82 and a scanning member 70 such as a mirror. Current for the drive coils is conducted to the rotor through the pivots which are electrically insulated from both base and rotor.

The rotor driving coils are free to move in the air gaps of a magnetic structure attached to the base. Flux is provided by a permanent magnet. The air gaps are designed to give very uniform flux in the operating range of the coils by having small area in relation to length.

To operate the detector a current is allowed to flow in the driving coils 81 and 82. Each coil experiences a force exerted on it in a direction mutually perpendicular to the direction of flux and current. The force on each coil is in the same direction, thus creating a couple which tends to rotate the rotor. Rotation is opposed by the flexure pivots. Since the electromagnetic force is constant in a uniform field and the spring rate of the pivots is constant, the rotor will assume an angular position proportional to the current in the driving coil. Moreover, the rotor will follow variations in the driving current if the frequency of the driving current is sufficiently low compared to the mechanical resonant frequency of the rotor. Obviously an electromagnet may be used to replace permanent magnet 21, if such is desired.

The field coils 33 and 34, whcih are flux-linked to the driving coils, are provided to enable the position of the driving coil and mirror assembly to be electrically indicated. As will be described in more detail hereinafter, the field coils can be excited by a high-frequency signal which, due to the mutual inductance between the field coils and the driving coils, will induce a high-frequency voltage in the driving coils of a magnitude dependent upon the angular position of the rotor from its null position. Alternatively, a high-frequency signal can be applied to the driving coils to induce a high-frequency voltage in the field coils of a magnitude dependent upon the angular position of the rotor. The induced high-frequency voltage can then be utilized to provide an indication of the angular position of the rotor.

POSITION-INDICATING SYSTEMS

Figure 9:
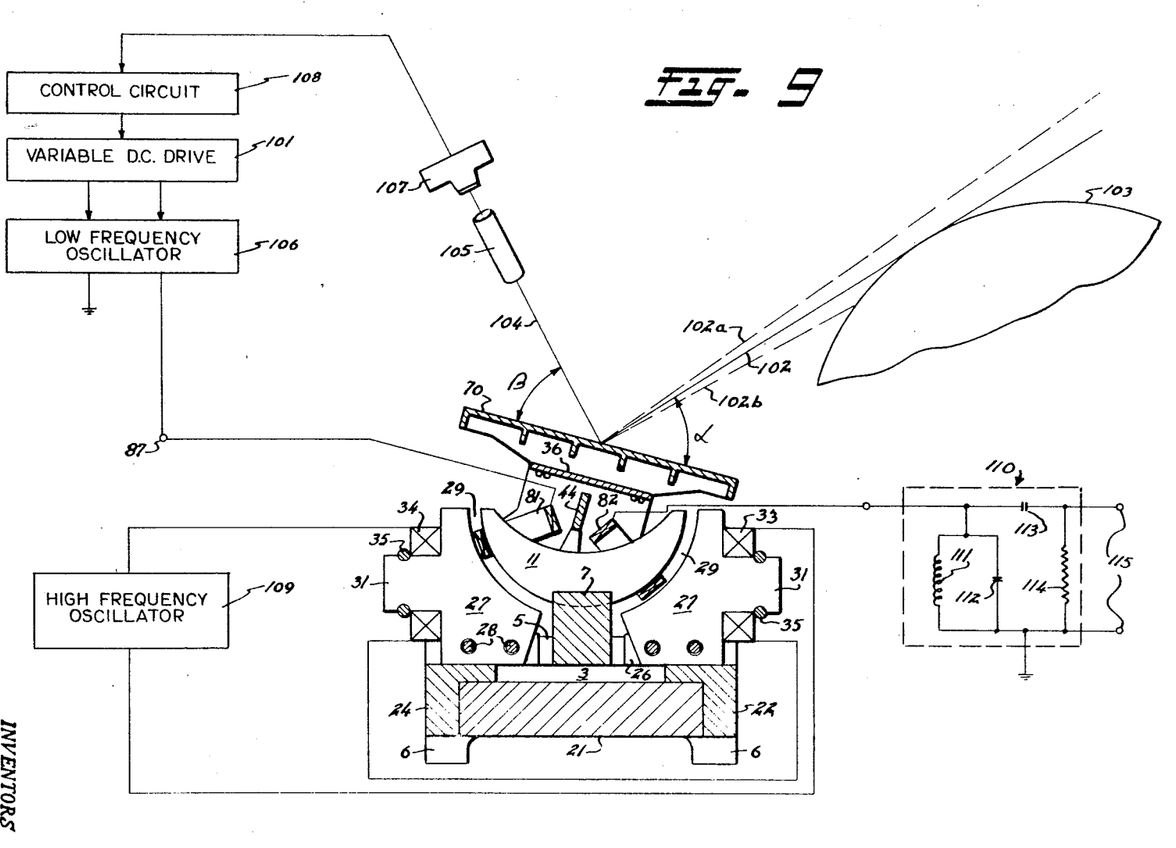
FIG. 9 is a generally schematic illustration of a position-indicating system employing the position detector which produces an output position signal usable in an open-loop control circuit.

The electromagnetic position detector described above may be used in the indicating system shown in FIG. 9, which illustrates a portion of a navigational system for space vehicles.

A D.C. drive voltage from the variable D.C. drive 101 is applied to the input terminal 87 of the drive coils 81 and 82. This D.C. voltage will drive the drive coils and mirror assembly to a position wherein the nominal line of sight 102 of mirror 70 is directed at the infrared horizon 103 of the earth, i.e., to the discontinuity of the infrared radiant energy of the earth and the background of space.

For any given position of the mirror 70, the line of sight 102 makes an angle α with the mirror surface equal to the angle β that the mirror output 104 makes with the mirror surface. The angle β of the mirror output 104 is determined by the position of telescope 105 (fixed relative to the frame of the electromagnetic position detector). The angles α and β will, of course, vary as the position of the mirror relative to the frame varies.

The D.C. drive voltage is modulated by a low-frequency A.C. dither signal from the dither oscillator 106. A dither signal is a signal of controlled amplitude and frequency applied to a servo device in order to vibrate or oscillate the device about its null position. This signal has a frequency comparable to the electro-mechanical resonant frequency of the electromagnetic position detector, and thus the drive coil and mirror will oscillate about the nominal position thereof (determined by the value of the D.C. drive voltage applied to the drive coils). In one operating embodiment of the invention the frequency of the dither signal is 30 cycles per second and produces an oscillation of the mirror of an amplitude of ±2° from the nominal position thereof.

When the nominal line of sight 102 of the mirror is centered on the earth's infrared horizon 103, the dither voltage will cause the instantaneous line of sight of the mirror to move between the limits 102a and 102b. For half of the dither cycle the mirror will be directed towards the earth, below the infrared horizon, and the intercepted radiant energy will be reflected along the line of the mirror output 104 through the telescope 105 to the transducer 107. For the other half of the dither cycle, the mirror will be directed above the earth's infrared horizon towards the background of space and no radiant energy will be reflected from the mirror. The output of the scanning mirror when centered on the horizon will be a square wave with equal-duration half cycles, which is referred to for purposes of this description as a null output.

If the relative positions of the space vehicle and earth shift slightly, then the nominal line of sight of the mirror will be directed either below or above the earth's infrared horizon, depending on the direction of shift. The mirror will now be directed at the earth for more or less than half of a dither cycle. As a consequence, the mirror output will be a rectangular wave of unequal-duration half cycles.

The mirror output is sensed by the transducer 107, which converts the square and rectangular waves of radiant energy into corresponding electrical waveshapes. The transducer output is fed to a control circuit 108 which senses the variations of the transducer output from null (wherein the half cycles are of equal duration) and utilizes those variations to vary the amount of D.C. voltage of the variable D.C. drive 101 in order to drive the drive coils and mirror assembly in the proper direction to again center the nominal line of sight of the mirror on the earth's infrared horizon, when the mirror output will return to null.

This feedback method of control of the angular position of the mirror in response to the mirror output is not new per se, and thus the details of same are not particularized in this application.

It is to be noted that the absolute value of D.C. drive voltage required to drive the drive coils and mirror assembly to the desired position wherein the line of sight of the mirror is centered on the earth's infrared horizon may vary. For example, the strength of the permanent magnet field of the magnet 21 may vary, thus varying the amount of D.C. drive required to center the line of sight on the earth's horizon. Similarly, the spring constant of the cross spring suspension may vary. Also, variations in temperature of the drive coils will vary the resistance thereof, thereby varying the amount of D.C. voltage required to produce the proper amount of current to drive the mirror to its desired position. However, the above described optical-electrical feedback loop will insure that the proper amount of D.C. drive will be supplied to move the mirror to its desired position. That is, more or less D.C. voltage, as required, will be applied to the drive coils until the mirror output returns to null.

The angular position of the mirror is electrically indicated by use of a relatively high-frequency fixed-amplitude oscillator 109 whose output is connected to the terminals of the field coils 33 and 34, to modulate the flux in the air gap. In the above described embodiment, this oscillator operates at 5,000 cycles per second, which is well above the electro-mechanical resonant frequency of the electromagnetic position detector, and thus this signal when induced into the drive coils will have no effect on the angular position of the drive coils and mirror assembly.

When the drive coils are in their nominal zero position, their inductance mutual with the field coils is zero, and no high-frequency alternating flux is induced in the drive coils. However, when the drive coils are deflected from zero position by D.C. current, a high-frequency alternating voltage is generated in the drive coils by the mutual inductance of the field coils and the drive coils of a magnitude proportional to the deflection angle of the drive coils. This alternating voltage appears at the output terminal 88 of the drive coils as an indication of the amount of angular deflection of the drive coils and mirror.

The output impedance of the low-frequency oscillator 106 is low at the frequency of the high-frequency oscillator 109 and thus the output of the low-frequency oscillator 106 appears as a short circuit to the high-frequency voltage induced in the drive coils so that all of the induced high-frequency voltage appears at the terminal 88 of the drive coils.

The low-frequency dither voltage also appears at the drive coil output terminal 88, and it is necessary to filter the high-frequency from the low-frequency voltage appearing on the output terminal in order to obtain a final signal that is primarily an indication of the position of the mirror 70. For this reason filter 110 is connected to terminal 88. Filter 110 includes a parallel inductance 111 and capacitor 112 tuned to the frequency of the high-frequency oscillator 109 and having a low D.C. resistance through the inductance. Thus, a low reactance path is provided from terminal 88 to ground for all frequencies except the 5,000-cycle-per-second position signals. Additionally, capacitor 113, having a low reactance at 5,000 cycles, and resistor 114 serve to filter the low-frequency dither voltage from the output terminals 115.

The final filtered output at the terminals 115 is thus essentially only the high-frequency position-indicating signal which is directly related to the angular position of the mirror 70, and is only indirectly related to the magnitude of the D.C. drive to the field coils. That is, the output signal will remain the same as long as the mirror is inclined at a particular angle, even though the absolute value of the D.C. drive necessary to drive the mirror to that position may vary, which variations are compensated for by the optical-electrical feedback loop above described.

The output at terminals 115 may then be fed to suitable computers for navigational control of the vehicle.

When the high-frequency oscillator 109 is connected to the drive coil, as shown in FIG. 9, the output signal at terminals 115 is not very suitable for use in an open-loop control system, due to the phase disturbance resulting from the filter 110. For example, in the above described embodiment, the dither frequency signal appearing at terminal 88 will be in the order of 1 volt per degree of mirror movement and the high-frequency position-indicating signal appearing at terminal 88 will be in the order of 10 millivolts per degree of mirror movement. In order to obtain a useful position signal at terminals 115, the low-frequency signal must be attenuated to at least about one tenth the magnitude of the high-frequency signal, or in this case the relative attenuation must be in the order of 1000 to 1. As is well known, such heavy relative attenuation will inherently introduce a large phase disturbance in the high-frequency output signal which can cause a destabilizing effect if that signal were to be used in a closed-loop feedback control system. However, if the signal is to be used in an open-loop control circuit wherein the phase relation of the position signals at terminals 88 and 115 is unimportant, then the phase disturbance is not objectionable.

Figure 10:
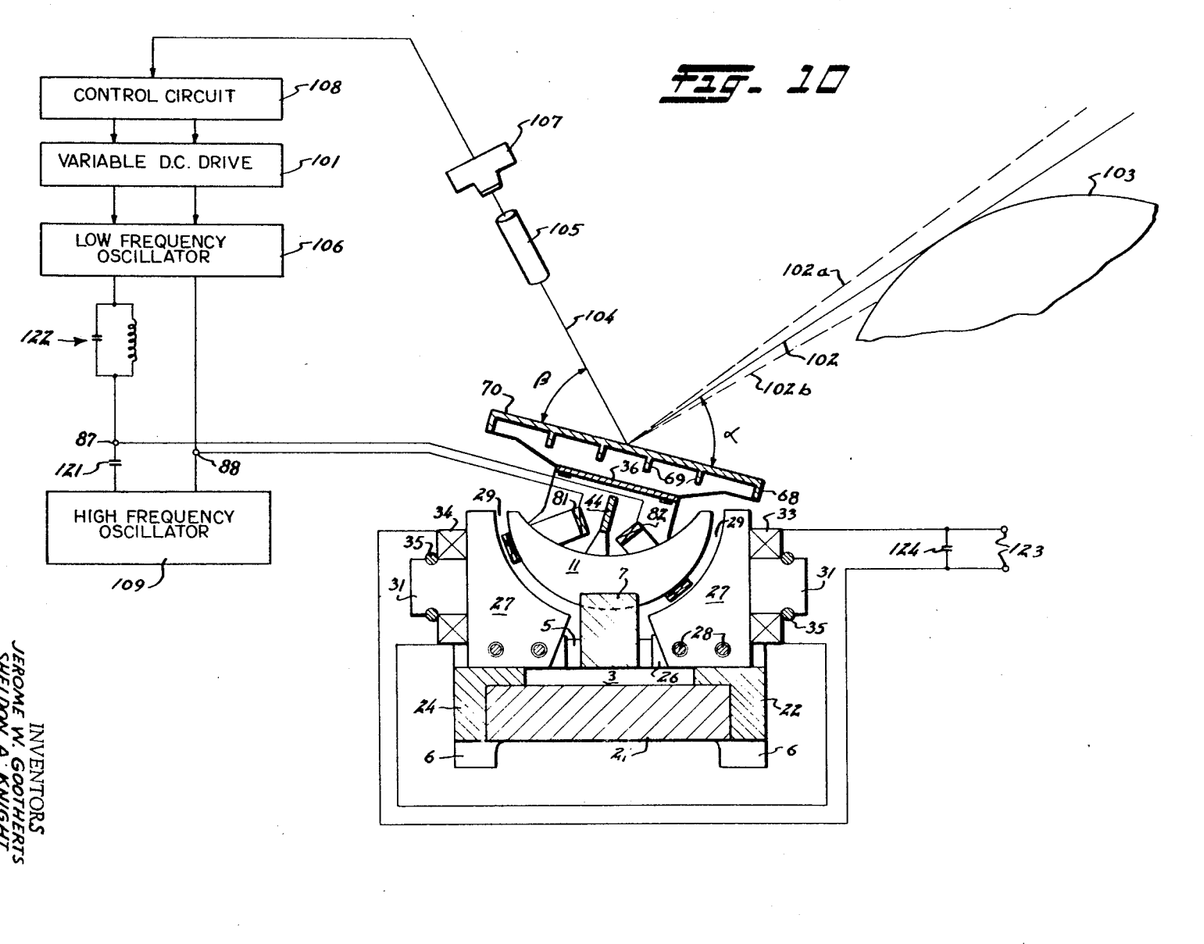
FIG. 10 is a generally schematic illustration of a position-indicating system employing the position detector which produces an output position signal usable in a closed-loop control circuit.

In the event that it is desired to use the high frequency position signal in a closed-loop feedback circuit, we have discovered that the phase disturbance can be greatly reduced by using a control system as shown in FIG. 10, wherein both the low-frequency dither oscillator 106 and the high-frequency oscillator 109 are connected to the drive coils 81 and 82. To isolate the oscillators, a capacitor 121, having a low reactance to the 5,000-cycle position signal and a high reactance to the 30-cycle dither signal, is connected to the output of the high-frequency oscillator 109 and a parallel tank circuit 122, tuned to 5,000 cycles per second, is connected to the output of the low-frequency oscillator 106.

The optical-electrical feedback operation of the system of FIG. 10 is precisely the same as that previously described. That is, the low-frequency dither oscillator 106 will cause the mirror to oscillate about its nominal position so that the line of sight 102 of the mirror 70 will move between the limits 102a and 102b above and below the infrared horizon of the earth. The detector 107 will sense a deviation of the nominal line of sight of the mirror from the horizon and will cause the control circuit 108 to actuate the variable D.C. drive 101 to drive the mirror to a position wherein it is recentered on the horizon.

The frequency of the high-frequency oscillator is well above the electro-mechanical resonant frequency of the detector so that no mirror movement is caused thereby.

The significance of the system of FIG. 10 is that the signal output from the system is now taken from the field coils. As before, the deflection of the mirror 70 and coils 81 and 82 will induce an alternating flux at both the dither frequency and the high position signal frequency in the field coils of a magnitude proportional to the amount of deflection of the mirror. This in turn will induce alternating voltages in the field coils at these frequencies. However, the magnitude of the voltages induced in the field coil by this mutual inductance will vary directly with the frequency of the excitation source, rising at 6 db per octave.

Thus, by taking advantage of the difference in attenuation of the dither and signal frequencies by the inductive coupling between the driving and field coils of the position detector, the need for heavy filtering of the output is eliminated. Thus, in the above described system, the position-indicating high-frequency signal at the output terminals 123 of the field coil is again in the order of 10 millivolts per degree of mirror movement, since the coupling will be the same whether the signal is applied to the field coil and taken from the drive coil, or vice versa. However, the dither signal, which is in the order of 1 volt per degree at the drive coil, is attenuated to about 10 millivolts at the field coil output terminals 123. It is still necessary to provide some filtering of the two signals to further attenuate the dither frequency signal relative to the position signal, but the amount of attenuation is of such a small degree, as compared to the system of FIG. 9, that the phase disturbance of the position signal at the output terminals is considerably less than that which would cause instability when the position signal is employed in a closed-loop feedback control circuit.

The filtering at the output terminals of the field coils can be accomplished, for example, by connecting a capacitor 124 across the field coils, thus forming a resonant circuit because of the capacitor and the inductance of the field coil. The value of capacitor 124 is chosen so that the circuit will resonate at the position signal frequency.

Having described our invention, what we claim is:

1. A position-indicating system comprising: magnetic means having a space gap for developing a steady magnetic field across said space gap, a drive coil pivotally supported in said space gap for angular displacement in accordance with the current flowing through said drive coil, a high frequency excitation means having a frequency higher than the electro-mechanical resonant frequency of said drive coil and electrically connected to said drive coil, a low frequency modulated D.C. drive source having a frequency lower than the electro-mechanical resonant frequency of said drive coil and electrically connected to said drive coil, a field coil inductively coupled to said drive coil, said field coil having output terminals.

2. A position-indicating system as set forth in claim 1 wherein said magnetic means comprises a permanent magnet having pole pieces defining said space gap therebetween.

3. A position-indicating system comprising: a frame, magnetic means mounted on said frame for developing a steady, closed-loop, magnetic field and having opposed pole pieces, an armature core supported by said frame between said pole pieces and in spaced relation thereto, the adjacent surface of said pole pieces and armature core defining an annular space gap, a drive coil disposed in said space gap for angular displacement in accordance with the current flowing through said drive coil, two opposed pairs of opposed flexure pivot assemblies mounting said drive coil on said frame for rotation of said drive coil about the axis of said annular space gap, a high frequency excitation source having a frequency higher than the electro-mechanical resonant frequency of said drive coil and electrically connected through said flexure pivot assemblies to said drive coil, a low frequency modulated D.C. drive source having a frequency lower than the electro-mechanical resonant frequency of said drive coil and electrically connected through said flexure pivot assemblies to said drive coil, and a field coil inductively coupled to said drive coil, said field coil having output terminals.

4. A position-indicating system comprising: magnetic means having a space gap for developing a steady magnetic field across said space gap, a drive coil pivotally supported in said space gap for angular displacement in accordance with the current flowing through said drive coil, a low frequency excitation means having a frequency lower than the electro-mechanical resonant frequency of said drive coil and electrically connected to said drive coil, a scanning member mounted for angular movement with said drive coil and having a scanning output adapted to be null when the nominal position of the line of sight of said scanning member is directed toward a discontinuity of a radiant energy source, means responsive to variations of the scanning output of said scanning member from null to impress a D.C. voltage on said drive coil to angularly displace said drive coil and scanning member to a position wherein said scanning output returns to null, a field coil inductively coupled to said drive coil, and a high frequency excitation means having a frequency higher than the electro-mechanical resonant frequency of said drive coil and electrically connected to one of said coils, the other of said coils having an output terminal.

5. A position-indicating system as set forth in claim 4, wherein said scanning member comprises a mirror.

6. A system as set forth in claim 4, wherein the high frequency excitation means is connected to said drive coil and said field coil has an output terminal.

7. A system as set forth in claim 4, wherein the high frequency excitation means is connected to said field coil and said drive coil has an output terminal.

8. A system as set forth in claim 7, and further including filtering means connected to said drive coil output terminal for separating high- from low-frequency voltages appearing thereat.

9. A position-indicating system comprising: a frame, magnetic means mounted on said frame for developing a steady, closed-loop, magnetic field and having opposed pole pieces, an armature core supported by said frame between said pole pieces and in spaced relation thereto, the adjacent surfaces of said pole pieces and armature core defining an annular space gap, a scanning member, two opposed pairs of opposed flexure pivot assemblies mounting said scanning member on said frame for rotation of said scanning member on said frame about the axis of said annular space gap, a drive coil mounted for movement with said scanning member and disposed in said space gap for angular displacement in accordance with the current flowing through said drive coil, a low-frequency drive source having a frequency lower than the electro-mechanical resonant frequency of said drive coil and electrically connected through said flexure pivot assemblies to said drive coil, said scanning member having a scanning output adapted to be null when the nominal position of the line of sight of said scanning member is directed towards a discontinuity of a radiant energy source, means responsive to variations of the scanning output of said scanning member from null to impress a D.C. voltage through said flexure pivot assemblies on said drive coil to angularly displace said drive coil and scanning member to a position wherein said scanning output returns to null, a field coil inductively coupled to said drive coil, and a high-frequency excitation source having a frequency higher than the electro-mechanical resonant frequency of said drive coil and electrically connected to one of said coils, the other of said coils having an output terminal.

10. A position-indicating system as set forth in claim 9, wherein said magnetic means comprises a permanent magnet.

11. A position-indicating system as set forth in claim 9, wherein said scanning member comprises a mirror.

12. A system as set forth in claim 9, wherein the high frequency excitation means is electrically connected through said flexure pivot assemblies to said drive coil and said field coil has an output terminal.

13. A system as set forth in claim 9, wherein the high frequency excitation means is electrically connected to said field coil and said drive coil has an output terminal.

14. A system as set forth in claim 13 and further including filtering means connected to said drive coil output terminal for separating high from low frequency voltage appearing thereat.

References Cited

UNITED STATES PATENTS

| 2,911,470 | 11/1959 | Greenleaf et al. | 178—7.6 |
| 3,020,414 | 2/1962 | McKnight et al. | 250—203 X |
| 3,087,373 | 4/1963 | Poor et al. | 250—203 X |
| 3,088,033 | 4/1963 | Kaufold | 250—203 |
| 3,135,869 | 6/1964 | Rosenthal | 250—235 |
| 3,191,038 | 6/1965 | Lannan | 250—203 |
| 3,194,966 | 7/1965 | Hulett | 250—203 |
| 3,237,010 | 2/1966 | Elliot et al. | 250—235 X |

WALTER STOLWEIN, Primary Examiner

U.S. Cl. X.R.

250—235; 317—124